US009633556B2

(12) United States Patent
Reams

(10) Patent No.: US 9,633,556 B2
(45) Date of Patent: Apr. 25, 2017

(54) ADJUSTING ACKNOWLEDGEMENT REQUESTS FOR REMOTE CONTROL TRANSMISSIONS BASED ON PREVIOUS ACKNOWLEDGEMENTS

(75) Inventor: William R. Reams, Englewood, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 1405 days.

(21) Appl. No.: 13/286,180

(22) Filed: Oct. 31, 2011

(65) Prior Publication Data

US 2013/0111192 A1 May 2, 2013

(51) Int. Cl.
*G06F 9/30* (2006.01)
*G08C 17/02* (2006.01)

(52) U.S. Cl.
CPC ......... *G08C 17/02* (2013.01); *G08C 2201/51* (2013.01)

(58) Field of Classification Search
CPC . G08C 17/02; G08C 2201/50; G08C 2201/51
USPC ............................ 341/176; 712/225, E9.016
See application file for complete search history.

(56) References Cited

U.S. PATENT DOCUMENTS 5,355,506 A * 10/1994 Mariani ........................ 709/236
5,802,454 A * 9/1998 Goshay ............. H04M 15/8033 340/7.25
2003/0081664 A1* 5/2003 Lu et al. ........................ 375/222
2003/0212816 A1* 11/2003 Bender et al. ................ 709/237
2004/0003106 A1* 1/2004 Cunningham et al. ........ 709/234
2005/0204247 A1* 9/2005 Guo et al. ...................... 714/746
2006/0067222 A1* 3/2006 Endoh ............................ 370/231
2008/0031138 A1* 2/2008 Okamasu et al. ............ 370/236
2010/0315261 A1* 12/2010 Rutjes et al. ............ 340/825.52

FOREIGN PATENT DOCUMENTS

JP EP 1885078 A2 * 2/2008 ........... H04L 1/1685

* cited by examiner

*Primary Examiner* — Quan-Zhen Wang
*Assistant Examiner* — Stephen Burgdorf
(74) *Attorney, Agent, or Firm* — LK Global

(57) ABSTRACT

A remote receives an instruction to transmit and determines whether or not to include an acknowledgement request in the instruction based on statistics regarding receipt of acknowledgements associated with previously transmitted instructions. If so, the remote control device includes the request before transmitting. The remote control may determine whether or not to include the request in a variety of different ways in a variety of different implementations. In some implementations, the remote control may classify instructions into two or more different classifications and may treat instructions of different classifications differently. In other implementations, the remote control may treat the same instruction differently depending on the number of requested acknowledgements successfully received during a time period. In various other implementations, the remote control may perform various combinations of these approaches.

16 Claims, 5 Drawing Sheets

ADJUSTING ACKNOWLEDGEMENT REQUESTS FOR REMOTE CONTROL TRANSMISSIONS BASED ON PREVIOUS ACKNOWLEDGEMENTS

FIELD OF THE INVENTION

This disclosure relates generally to remote controls, and more specifically to determining whether or not to request acknowledgements for instruction transmissions based at least on acknowledgements received for previous transmissions.

SUMMARY

The present disclosure discloses systems and methods for adjusting acknowledgement requests for remote control transmissions based at least on previous acknowledgements. A remote control may receive one or more instructions to transmit. The remote control may determine whether or not to include one or more acknowledgement requests in the instruction based on statistics regarding receipt of acknowledgements associated with previously transmitted instructions. If the remote control determines to include the acknowledgement request, the remote control device includes the acknowledgement request with its transmitted instruction. Regardless of whether or not the acknowledgement request is included, the remote control transmits the instruction. If the transmitted instruction included an acknowledgement request, the remote control may determine whether or not the requested acknowledgement is received. The remote control may update the statistics with the information as to whether or not the requested acknowledgement is received and may retransmit the instruction if the requested acknowledgement is not received.

The remote control may determine whether or not to include the acknowledgement request in a particular instruction based at least on the statistics regarding receipt of acknowledgements associated with previously transmitted instructions in a variety of different ways in a variety of different implementations. In some implementations, the remote control may classify instructions into two or more different classifications and may treat instructions of different classifications differently.

In other implementations, the remote control may treat the same instruction differently depending on the number of requested acknowledgements successfully received during a time period. In some cases of such implementations, the remote control may determine to include an acknowledgement request if the previous acknowledgment reception number or rate is below a threshold value. In other cases of such implementations, the remote control may determine to include an acknowledgement request based at least on the relationship of the number to several different threshold values (such as including the acknowledgement request if the number is less than a first threshold value, not including acknowledgement request if the number is not less than a second threshold value, and including the acknowledgement request if the number is less than the second threshold value and a period has elapsed since the last instruction of the same type was transmitted including an acknowledgement request).

In various other implementations, the remote control may perform various combinations of these approaches. For example, the remote control may always include acknowledgement request for instructions classified as critical and may also include acknowledgement request for instructions classified as noncritical if the number of requested acknowledgements successfully received during a time period is less than a threshold value. However the remote control may not include acknowledgement requests for noncritical messages if the requested acknowledge-ments successfully received during a time period is greater than a threshold value.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
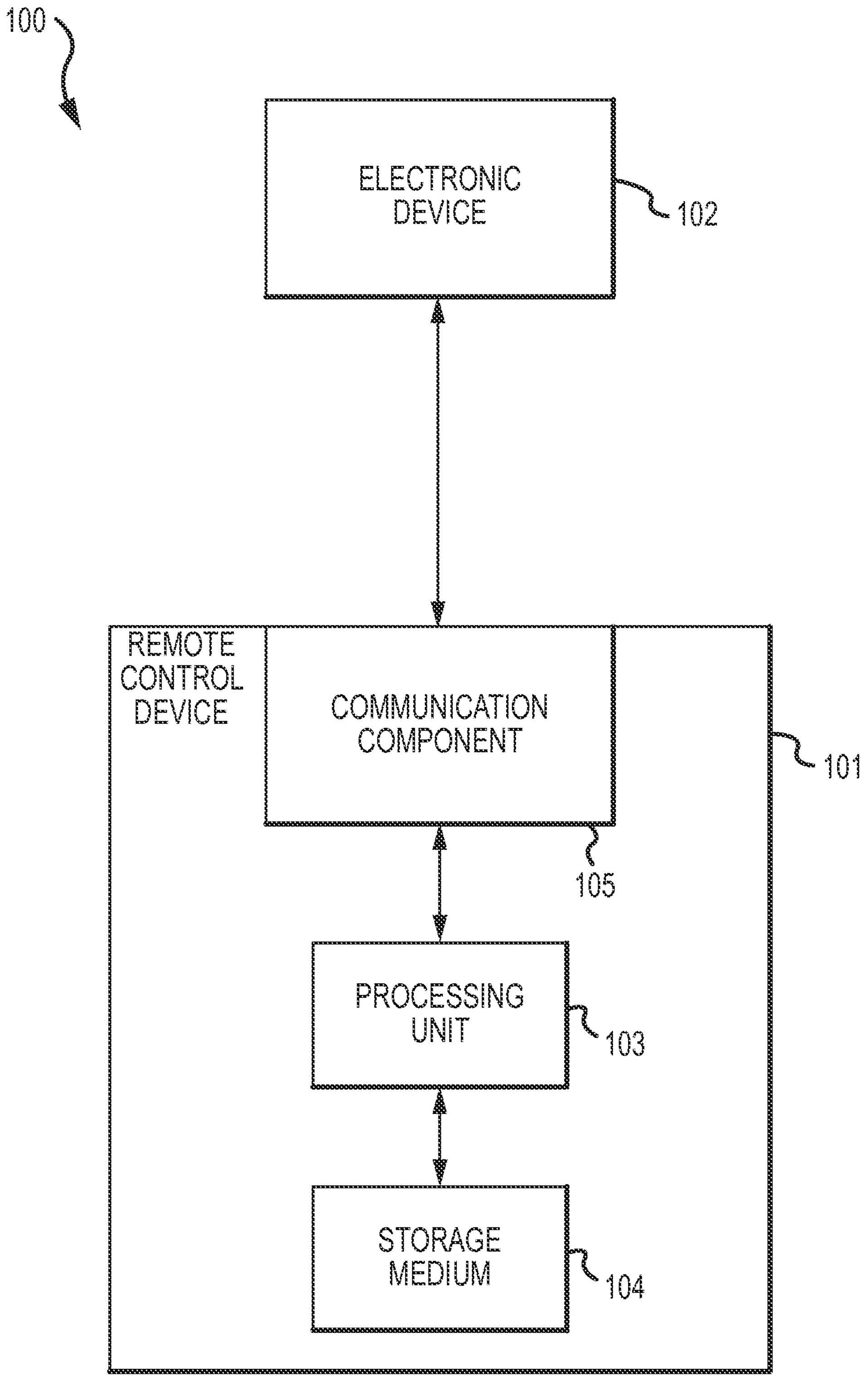
FIG. 1 is a block diagram illustrating a system for adjusting acknowledgement requests for remote control transmissions based at least on previous acknowledgements.

The description that follows includes sample systems, methods, and computer program products that embody various elements of the present disclosure. However, it should be understood that the described disclosure may be practiced in a variety of forms in addition to those described herein.

Electronic devices of varying kinds may perform any number of a variety of different functions. These functions may be performed in response to instructions received via one or more associated control devices, such as one or more remote control devices. Examples of such electronic devices include content players, electronic kitchen appliances, automobiles, televisions, set top boxes, television receivers, digital video recorders, television tuners, digital music players, desktop computers, laptop computers, cellular telephones, smart phones, mobile computing devices, environmental control systems, and so on.

In some implementations, an associated control device may transmit an instruction to an electronic device and may not request that the electronic device provide any kind of acknowledgement (or may not even be capable of receiving an acknowledgment such as a traditional infrared remote control). In such cases, the control device may never be aware whether or not the transmitted instruction is actually received and acted upon. In effect, the control device may merely transmit the instruction and assume the instruction is received regardless whether or not this is the actually case.

In other implementations, an associated control device may include an acknowledgement request in every instruction that is transmitted to an electronic device. The control device may then monitor whether or not the acknowledgement is received. If the acknowledgement is not received the control device may retransmit the instruction. This sequence of operations may be repeated until an acknowledgement is received and the control device is certain that the transmitted instruction has been received by the electronic device.

Both of the above approaches have drawbacks. Control devices that do no include acknowledgement requests in transmitted instructions may be unable to handle situations where a transmitted instruction is not received as the control device may never become aware of this situation. However, control devices that request acknowledgement for every transmitted instruction risk consuming too much of the available communication bandwidth. Although the control device may be certain that a transmitted instruction is received, acknowledgement requests and corresponding acknowledgements may utilize limited communication resources that could otherwise be utilized for transmission of other instructions. Instructions that have a high data rate, such as pointer/cursor moving instructions as opposed to lower data rate instructions such as a channel change instruction, may exacerbate this limited resource consumption situation.

The present disclosure discloses systems and methods for adjusting acknowledgement requests for remote control transmissions based at least on previous acknowledgements. A remote control may receive one or more instructions to transmit. The remote control may receive the instruction to transmit via one or more user interface components (such as one or more buttons and/or other selection devices). The instruction may be received for the remote control to transmit to one or more associated electronic devices. The remote control may determine whether or not to include one or more acknowledgement requests in the instruction based on statistics regarding receipt of acknowledgements associated with previously transmitted instructions. If the remote control determines to include the acknowledgement request, the remote control device includes the request for acknowledgement with the transmitted instruction/message. If the remote control determines to not include the acknowledgement request, the request for acknowledgement is not included. Regardless, the remote control transmits the instruction. In this way, the remote control may request acknowledgement for some instructions and not others, balancing certainty for some instructions with lower communication resource consumption in general.

FIG. 1 is a block diagram illustrating a system 100 for adjusting acknowledgement requests for remote control transmissions based at least on previous acknowledgements. The system 100 includes a remote control device 101 and one or more associated electronic devices 102. The electronic device may be a content player, an electronic kitchen appliance, an automobile, a television, a set top box, a television receiver, a digital video recorder, a television tuner, a digital music player, a desktop computer, a laptop computer, a cellular telephone, a smart phone, a mobile computing device, an environmental control system, and/or any other kind of electronic device that is configured to perform one or more operations in response to instructions received from the remote control device.

The remote control device 101 may include one or more processing units 103, one or one or more non-transitory storage media 104 (which may take the form of, but is not limited to, a magnetic storage medium; optical storage medium; magneto-optical storage medium; read only memory; random access memory; erasable programmable memory; flash memory; and so on), and/or one or more communication components 105. The processing unit may execute one or more instructions stored in the non-transitory storage medium to communicate with the electronic device 102 via the communication component. Such communication may include transmitting one or more instructions to the electronic device.

The processing unit 103 may receive one or more instructions to transmit to the electronic device. Such instructions may be received via one or more user interface components (such as one or more buttons, keys, and/or any other selection element) (not shown). In some cases, receiving an instruction to transmit may include receiving an indication of an instruction rather than the instruction itself and the processing unit may interpret the indication and transmit the corresponding instruction. When the processing unit receives one or more instructions to transmit to the electronic device, the processing unit may determine whether or not to include an acknowledgement request based at least on statistics (which may be stored in the non-transitory storage medium) regarding receipt of acknowledgements associated with previously transmitted instructions (such as the number of acknowledgements successfully received during a period of time such as thirty minutes, the number of acknowledgments successfully received out of a total number requested, and so on). If the processing unit determines to include the acknowledgement request, the processing unit may include the request while transmitting the instruction via the communication component 105.

For example, in one or more implementations, the processing unit 103 may transmit the instruction in the form one or more packets. In such implementations, one or more bits of a packet may indicate whether or not an acknowledgment is requested (such as a "1" to indicate that an acknowledgement is requested or a "0" to indicate that an acknowledgement is not requested).

If a transmitted instruction included an acknowledgement request, the processing unit 103 may determine whether or not the requested acknowledgement is received. In some cases, the processing unit may determine that a requested acknowledgment is not going to be received if the acknowledgement is not received within a certain timeout period (such as one second) from the time of transmission. If the processing unit determines that the requested acknowledgement is not received, the processing unit may retransmit the instruction. In some cases, the processing unit may repeat this process until an acknowledgement is received. In other cases, the processing unit may repeat this process a set number of times (such as four) before determining to cease retransmission.

In various cases, where the transmitted instruction included an acknowledgement request, the processing unit 103 may add information regarding whether or not the requested acknowledgement is received to the statistics. In this way, the statistics may be continually and/or periodically updated.

The processing unit 103 may determine whether or not to include the acknowledgement request in a particular instruction based at least on the statistics in a variety of different ways in a variety of different implementations. In a first approach, the processing unit may classify instructions into two or more different classifications and may treat instructions of different classifications differently. For example, the processing unit may classify instructions into critical and noncritical classes. The processing unit may include acknowledgement requests in all critical instructions but may only include acknowledgement requests in noncritical instructions if the number of requested acknowledgements successfully received during a time period is less than a threshold value (such as twenty of the last twenty-five requested acknowledgements).

In this example, the processing unit may classify instructions as critical or noncritical utilizing a variety of different criteria. For instance, the processing unit may classify low data rate, infrequent instructions such as "power on", "play," "increase volume," or "change channel" as critical because they may impact a user significantly if a requested instruction is not performed. To the contrary, the processing unit may classify high data rate, repetitious instructions such as pointer/cursor movement instructions (e.g. instructions from user interface navigation devices such as a computer mouse, touchpad, optical finger navigation device or the like) as noncritical because they tend to be repeated a number of times by a user to obtain a desired effect and omission of one such instruction may not be noticed by a user.

Additionally, the same instruction may be classified as critical in one scenario and noncritical in another. For example, selection of a direction selection element may indicate a pointer movement instruction if not in the context of a menu and as a menu item selection instruction if in the context of a menu. As such, the processing unit 103 may classify the selection of the direction selection element as critical if a selection has recently been received that corresponds to opening of a menu and as noncritical of such a selection has not recently been received.

Although this first approach is described as including critical and noncritical classification for instructions, it is understood that is for the purposes of example. In various other approaches the processing unit 103 may classify instructions into any number of different classifications (such as critical, semi-critical, and noncritical) and treat the different classifications differently in determining whether or not to include an acknowledgement request in a particular instruction without departing from the scope of the present disclosure. Additionally, the different classifications may be treated differently based upon the current situation or operational mode.

In a second approach, the processing unit 103 may treat the same instruction differently depending on the number of requested acknowledgements successfully received during a time period or based upon the number of requested acknowledgements. For example, if the number of requested acknowledgements successfully received is less than a first threshold value (such as ten in the last minute or out of the last 10 requested ACKs), the processing unit may determine to include an acknowledgement request. To the contrary, if the number of requested acknowledgements successfully received equals or exceeds a second threshold value (such as thirty in the last minute), the processing unit may determine not to include an acknowledgement request. Moreover, if the number of requested acknowledgements successfully received equals or exceeds the first threshold value but not the second threshold value, the processing unit may determine to include the acknowledgement request if a period has elapsed since an instruction of the same type (such as a pointer/cursor movement instruction) has been transmitted including an acknowledgement request. In this way, an acknowledgement instruction may not be include with every instruction of a certain type, but may be periodically included to ensure that at least some of this type of instruction are received and/or to ensure that acknowledgments are periodically requested and received at least at a minimum rate. The processing unit may measure such a period according to a time (such as ten seconds) since an instruction of the same type was transmitted including an acknowledgement request, a number of the same time of instructions that have been transmitted (such as five) since an instruction of the same type was transmitted including an acknowledgement request, and so on.

Moreover, the processing unit 103 may adjust the period based on the amount that the number of requested acknowledgements successfully received is less than the second threshold value. For instance, when the number of requested acknowledgements successfully received is less than the second threshold value by at least a first amount (such as five), the period may be shortened. To the contrary, when the number of requested acknowledgements successfully received is greater than the second threshold value by less than the first amount, the period may be lengthened. In this way, the further away from the second threshold value the number of requested acknowledgements successfully received, indicating that fewer transmitted instructions have been received and/or fewer requested acknowledgments have been successfully received, the more frequently acknowledgment request may be included in transmitted instructions to ensure that transmitted instructions are received. Conversely as acknowledgement rates are high, the frequency of requesting acknowledgments is reduced.

Although the above approaches discuss determining whether or not to include acknowledgement requests based on the statistics regarding receipt of acknowledgements associated with previously transmitted instructions in the context of the number of requested acknowledgements successfully received, other measurements may be utilized without departing from the scope of the present disclosure. For example, the ratio of acknowledgements requested to the number received may be utilized. However, as this measurement detects failure as opposed to success, this measurement may transmit fewer acknowledgements when less statistical information is obtained (such as when the remote control 101 is first utilized). In such cases where less statistical information is available, the number of requested acknowledgements successfully received may transmit more acknowledgements until the processing unit 103 ensures that the remote control device and the electronic device 102 are communicating correctly.

Additionally, although the above approaches are described as separate approaches, this is for the purpose of clarity by way of example. One or more such approaches may be combined without departing from the scope of the present disclosure. For example, the processing unit 103 may classify instructions into critical and noncritical instructions, always include acknowledgement requests in critical instructions, and determine whether or not to include acknowledgement requests in noncritical instructions depending on the relationship between the number or rate of requested acknowledgements successfully received to multiple threshold values as described above.

Figure 2:
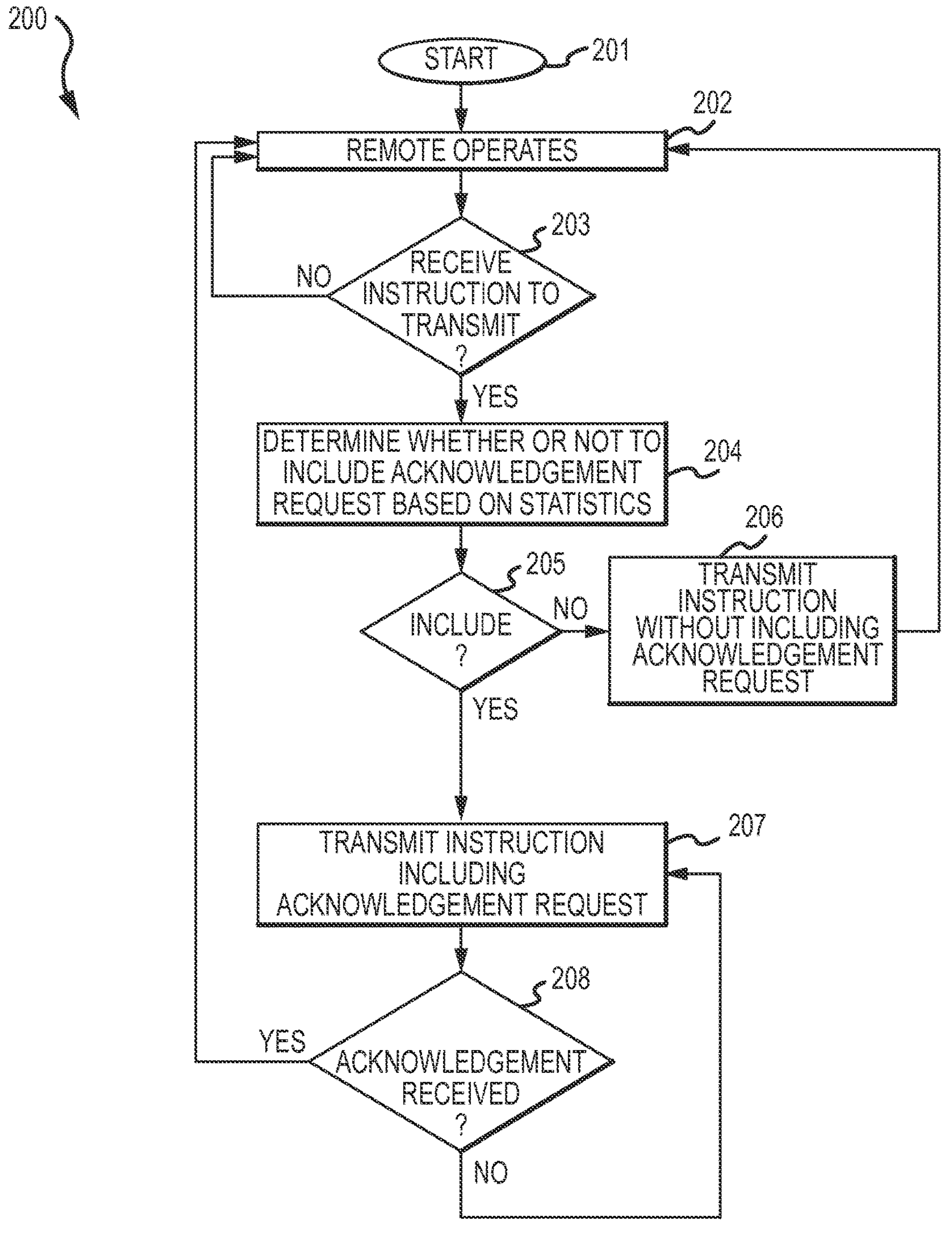
FIG. 2 is a flow chart illustrating a method for adjusting acknowledgement requests for remote control transmissions based at least on previous acknowledgements. This method may be performed by the system of FIG. 1.

FIG. 2 illustrates a method 200 for adjusting acknowledgement requests for remote control transmissions based at least on previous acknowledgements. The method 200 may be performed by the remote control device 101 of FIG. 1. The flow begins at block 201 and proceeds to block 202 where the remote control device operates. The flow then proceeds to block 203 where the processing unit 103 determines whether or not an instruction to transmit is received. If so, the flow proceeds to block 204. Otherwise, the flow returns to block 202 where the remote control device continues to operate.

At block 204, after the processing unit 103 determines that an instruction to transmit is received, the processing unit determines whether to include an acknowledgement request in the instruction based on statistics regarding receipt of acknowledgements associated with previously transmitted instructions. If the processing unit determines not to include the acknowledgement request, the flow proceeds to block 206 where the processing unit may transmit the instruction without including the acknowledgement request via the communication component 105 before the flow returns to block 202 and the remote control device 101 continues to operate. Otherwise, the flow may proceed to block 207.

At block 207, after the processing unit 103 determines to include the acknowledgement request in the instruction, the processing unit may transmit the instruction including the acknowledgement request via the communication component 105 before the flow proceeds to block 208. At block 208, the processing unit may determine whether or not the requested acknowledgement is received (and may add information regarding such to the statistics regarding receipt of acknowledgements associated with previously transmitted instructions stored in the storage medium 104). If so, the flow returns to block 202 where the remote control device continues to operate. Otherwise, the flow returns to block 210 where the processing unit may retransmit the instruction.

Figure 3A:
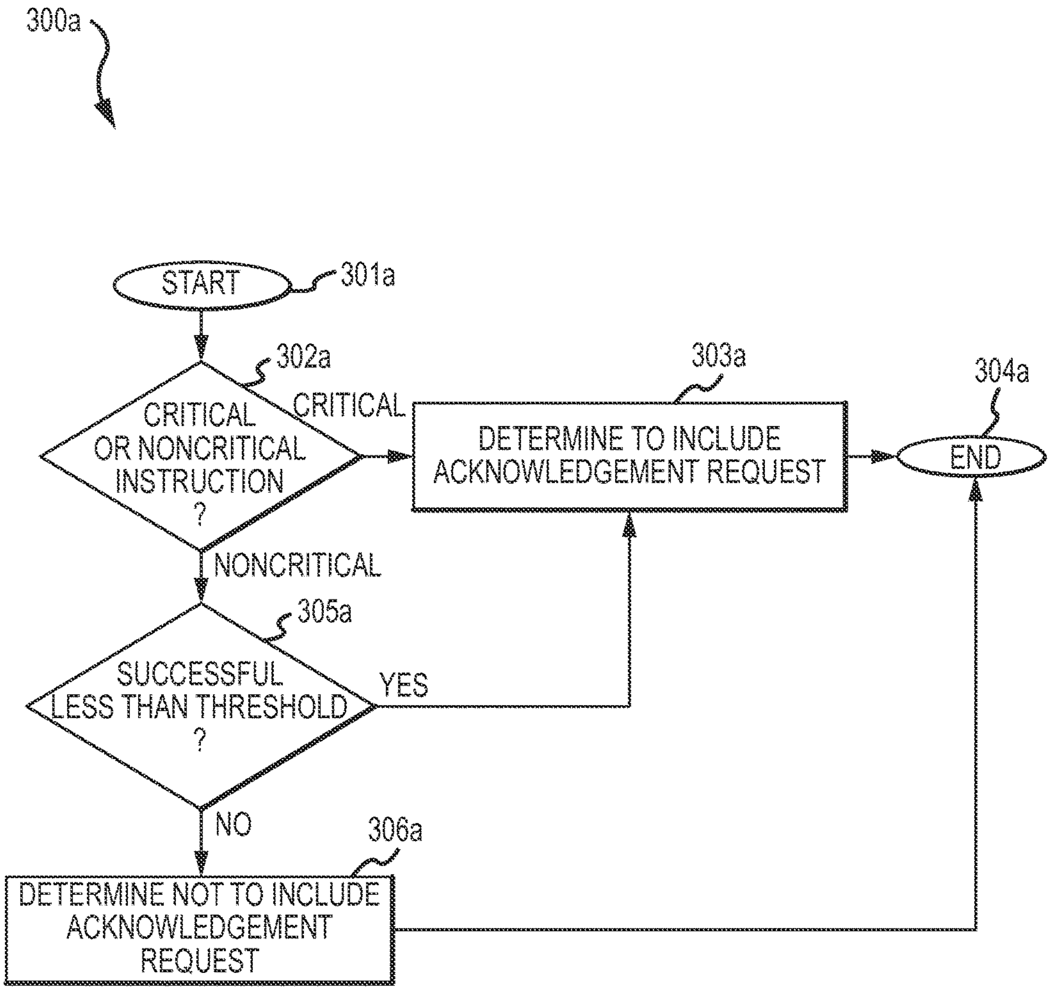
FIG. 3A is a flow chart illustrating a first method of determining whether or not to include an acknowledgement request in a remote control instruction based on received acknowledgements that may be performed as part of the method of FIG. 2.

FIG. 3A illustrates a first method 300*a* of determining whether or not to include an acknowledgement request in a remote control instruction based on received acknowledgements. The method 300*a* may be performed as part of performing block 204 of method 200. The flow begins at block 301*a* and proceeds to block 302*a* where the processing unit 103 determines whether an instruction to transmit is critical or noncritical. If the instruction is critical, the flow proceeds to block 303*a*. Otherwise, the flow proceeds to 305*a*.

At block 303*a*, after the processing unit 103 determines that the instruction to transmit is critical, the processing unit determines to include an acknowledgement request in the instruction. The flow then proceeds to block 304*a* and ends.

At block 305*a*, after the processing unit 103 determines that the instruction to transmit is noncritical, the processing unit determines whether or not the number of requested acknowledgements successfully received is less than a threshold value. If so, the flow proceeds to block 303*a* where the processing unit determines to include an acknowledgement request in the instruction before the flow proceeds to block 304*a* and ends. Otherwise, the flow proceeds to block 306*a* where the processing unit determines not to include an acknowledgement request in the instruction before the flow proceeds to block 304*a* and ends.

Figure 3B:
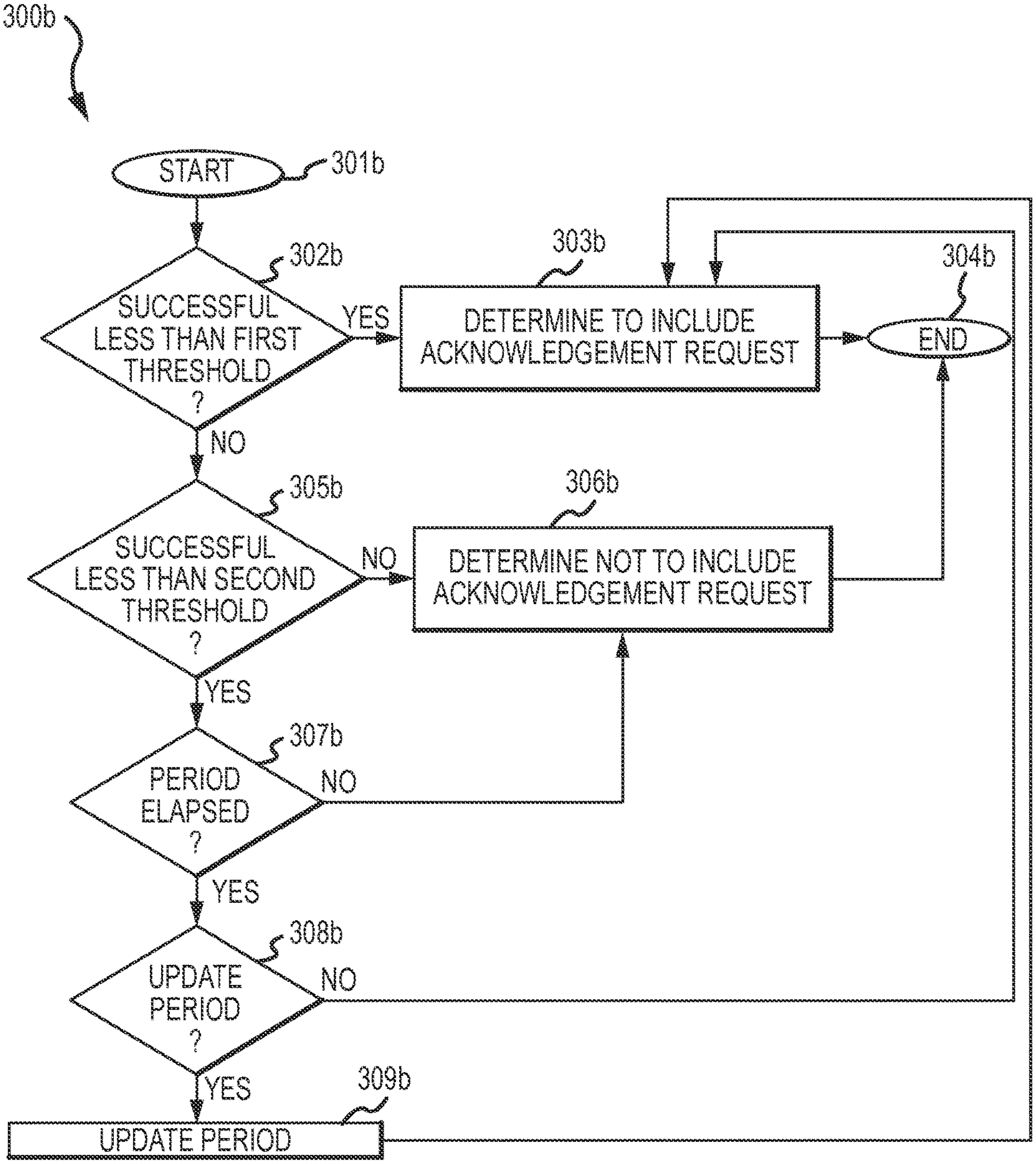
FIG. 3B is a flow chart illustrating a second method of determining whether or not to include an acknowledgement request in a remote control instruction based on received acknowledgements that may be performed as part of the method of FIG. 2.

FIG. 3B illustrates a second method 300*b* of determining whether or not to include an acknowledgement request in a remote control instruction based on received acknowledgements. The method 300*b* may be performed as part of performing block 204 of method 200. The flow begins at block 301*b* and proceeds to block 302*b* where the processing unit 103 determines whether or not the number of requested acknowledgements successfully received is less than a first threshold value. If so, the flow proceeds to block 303*b*. Otherwise, the flow proceeds to 305*b*.

At block 303*b*, after the processing unit 103 determines that the number of requested acknowledgements successfully received is less than the first threshold value, the processing unit determines to include an acknowledgement request in the instruction. The flow then proceeds to block 304*b* and ends.

At block 305*b*, after the processing unit 103 determines that the number of requested acknowledgements successfully received is not less than the first threshold value, the processing unit determines whether or not the number of requested acknowledgements successfully received is less than a second threshold value. If not, the flow proceeds to block 306*b* where the processing unit determines not to include an acknowledgement request in the instruction before the flow proceeds to block 304*b* and ends. Otherwise, the flow proceeds to block 307*b*.

At block 307*b*, after the processing unit 103 determines that the number of requested acknowledgements successfully received is less than the second threshold value, the processing unit determines whether or not a period has elapsed since the last instruction of the same type as the instruction was transmitted including an acknowledgement request. In some implementations, the period may be measured according to a time period. In other implementations, the period may be measured according to a count of transmitted instructions. If not, the flow proceeds to block 306*b* where the processing unit determines not to include an acknowledgement request in the instruction before the flow proceeds to block 304*b* and ends. Otherwise, the flow proceeds to block 308*b*.

At block 308*b*, after the processing unit 103 determines that the period has elapsed since the last instruction of the same type as the instruction was transmitted including an acknowledgement request, the processing unit determines whether or not to update the period. If so, the flow proceeds to block 309*b* where the processing unit updates the period and the flow proceeds to block 303*b* where the processing unit determines to include an acknowledgement request in the instruction before the flow proceeds to block 304*b* and ends. Otherwise, the flow proceeds to directly from block 308*b* to block 303*b* where the processing unit determines to include an acknowledgement request in the instruction before the flow proceeds to block 304*b* and ends.

Figure 3C:
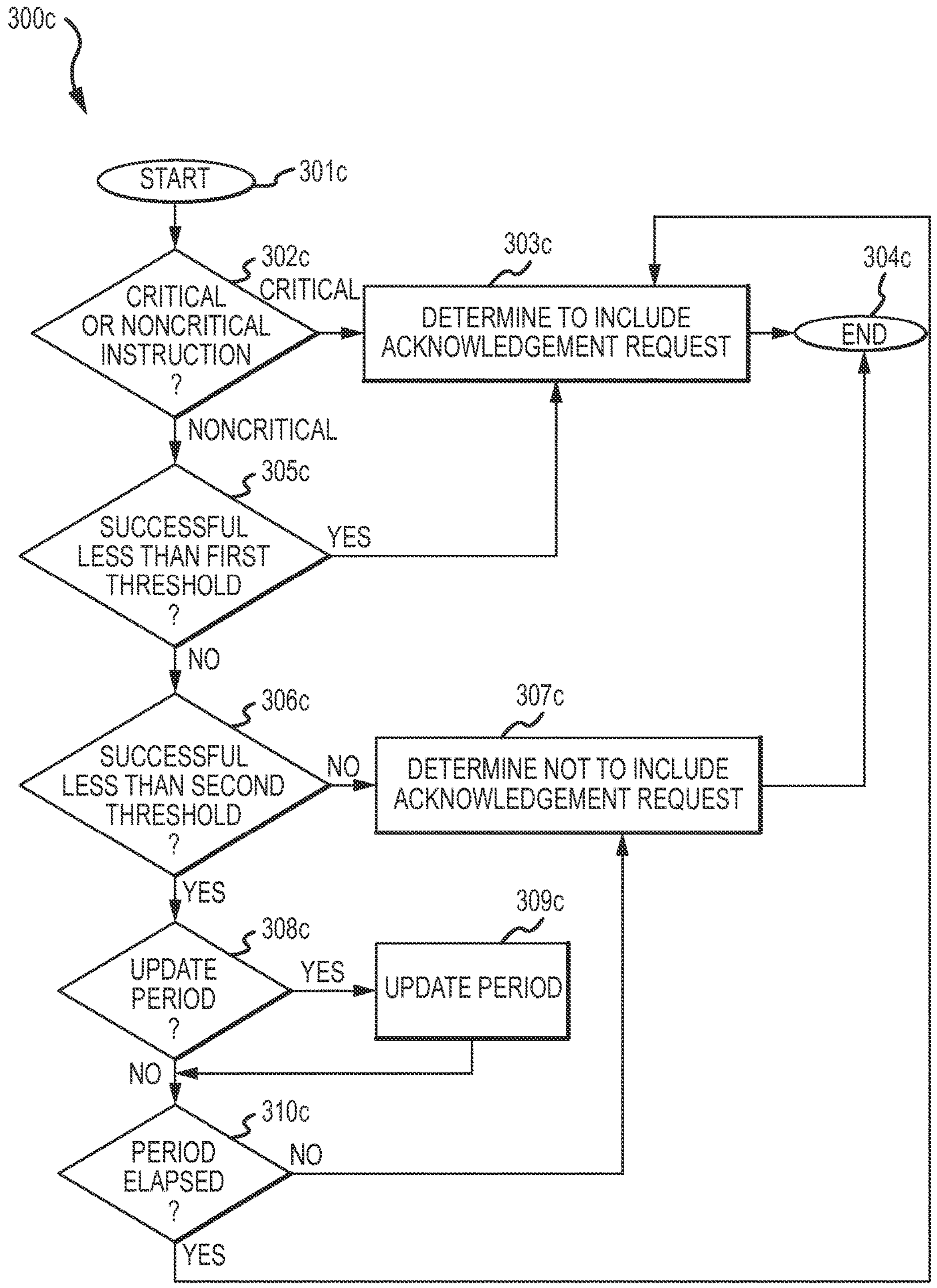
FIG. 3C is a flow chart illustrating a third method of determining whether or not to include an acknowledgement request in a remote control instruction based on received acknowledgements that may be performed as part of the method of FIG. 2.

FIG. 3C illustrates a third method 300*c* of determining whether or not to include an acknowledgement request in a remote control instruction based on received acknowledgements. The method 300*c* may be performed as part of performing block 204 of method 200. The flow begins at block 301*c* and proceeds to block 302*c* where the processing unit 103 determines whether or not an instruction to transmit is critical or noncritical. If the instruction is critical, the flow proceeds to block 303*c*. Otherwise, the flow proceeds to 305*c*.

At block 303*c*, after the processing unit 103 determines that the instruction to transmit is critical, the processing unit determines to include an acknowledgement request in the instruction. The flow then proceeds to block 304*c* and ends.

At block 305*c*, after the processing unit 103 determines that the instruction to transmit is noncritical, the processing unit determines whether or not the number of requested acknowledgements successfully received is less than a first threshold value. If so, the flow proceeds to block 303*c* where the processing unit determines to include an acknowledgement request in the instruction before the flow proceeds to block 304*c* and ends. Otherwise, the flow proceeds to 306*c*.

At block 306*c*, after the processing unit 103 determines that the number of requested acknowledgements successfully received is not less than the first threshold value, the processing unit determines whether or not the number of requested acknowledgements successfully received is less than a second threshold value. If not, the flow proceeds to block 307*c* where the processing unit determines not to include an acknowledgement request in the instruction before the flow proceeds to block 304*c* and ends. Otherwise, the flow proceeds to block 308*c*.

At block 308*c*, after the processing unit 103 determines that the number of requested acknowledgements successfully received is less than the second threshold value, the processing unit determines whether or not to update a period. If so, the flow proceeds to block 309*c* where the processing unit updates the period and the flow proceeds to block 310*c*. Otherwise, the flow proceeds to directly from block 308*c* to block 310*c*.

At block 310*c*, the processing unit 103 determines whether or not the period has elapsed since the last instruction of the same type as the instruction was transmitted including an acknowledgement request. In some implementations, the period may be measured according to a time period. In other implementations, the period may be measured according to a count of transmitted instructions. If not, the flow proceeds to block 307*c* where the processing unit determines not to include an acknowledgement request in the instruction before the flow proceeds to block 304*c* and ends. Otherwise, the flow proceeds to block 303*c* where the processing unit determines to include an acknowledgement request in the instruction before the flow proceeds to block 304*c* and ends.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for adjusting acknowledgement requests for remote control transmissions of a plurality different types based at least on a history of received previous acknowledgements, the method comprising:

processing a current instruction of a particular type, utilizing at least one processing unit, to transmit via a remote control device;

determining, utilizing the at least one processing unit, whether or not to include a current acknowledgement request in the current instruction based at least on statistics regarding receipt of past acknowledgements transmitted in response to previously transmitted instructions other than the current instruction, wherein the determining step comprises:

if a number of past acknowledgements successfully received by the remote control device during a first time period prior to processing the current instruction is less than a first threshold value, determining to include the current acknowledgement request in the current instruction;

if the number of past acknowledgements successfully received by the remote control device during the first time period is less than a second threshold value greater than the first threshold value, but at least equals the first threshold value, determining to include the acknowledgement request only if a second time period has elapsed since the remote control device has transmitted an instruction of a same type as the current instruction, with an acknowledgement request; and if the number of past acknowledgments successfully received by the remote control device during the first time period prior to the processing of the current instruction is greater or equal to the second threshold value, or if less than the second time period has elapsed since the remote control device has transmitted the instruction of the same type as the current instruction with an acknowledgment request, determining not to include the acknowledgment request in the current instruction;

if said operation of determining determines to include the current acknowledgement request in the current instruction, transmitting, utilizing the remote control device, the current instruction with the current acknowledgement request; and if said operation of determining determines to not include the current acknowledgement request in the current instruction, transmitting, utilizing the remote control device, the current instruction without an acknowledgement request.

2. The method of claim 1, wherein said operation of determining, utilizing the at least one processing unit, whether or not to include a current acknowledgement request in the current instruction based at least on statistics regarding receipt of past acknowledgements transmitted in response to previously transmitted instructions further comprises:

if the current instruction is of a first classification of instruction, determining to include the current acknowledgement request; and if the current instruction is of a second classification of instruction, determining to include the current acknowledgement request if a number of acknowledgements successfully received during a time period is less than a threshold value.

3. The method of claim 2, wherein the second classification of instruction comprises a high data rate type of instruction.

4. The method of claim 1, wherein the second time period is measured according to at least one of: a time elapsed since the instruction of the same type as the current instruction has been transmitted with an acknowledgement request, or a number of instructions of the same type as the current instruction that have been transmitted since the instruction of the same type as the current instruction has been transmitted with an acknowledgement request.

5. The method of claim 1, wherein the second time period is shortened when the number of past acknowledgements successfully received during the first time period is less than the second threshold value by at least a first amount and the second time period is lengthened when the number of past acknowledgements successfully received during the first time period is less than the second threshold value by less than the first amount.

6. The method of claim 1, wherein the transmitted instruction includes the current acknowledgement request, and further comprising determining whether an acknowledgement is received within a timeout period in response to the current acknowledgement request.

7. The method of claim 6, further comprising adding information regarding whether the acknowledgement is received within the timeout period in response to the current acknowledgement request to the statistics regarding receipt of acknowledgements transmitted in response to previously transmitted instructions.

8. The method of claim 6, further comprising if the acknowledgement is not received within the timeout period in response to the current acknowledgement request, retransmitting the current instruction.

9. A system for adjusting acknowledgement requests for remote control transmissions of a plurality different types based at least on a history of received previous acknowledgements, comprising:

a remote control device, comprising:

at least one non-transitory storage medium that stores statistics regarding receipt of past acknowledgements transmitted in response to instructions previously transmitted by the remote control device;

at least one communication component for transmitting instructions; and at least one processing unit that processes a current instruction of a particular type, to transmit by the remote control device via the at least one communication component;

wherein the at least one processing unit:

determines whether to include a current acknowledgement request in the current instruction based at least on the statistics regarding receipt of past acknowledgements transmitted in response to instructions, other than the current instruction, previously transmitted by the remote control device, if a number of past acknowledgements successfully received by the remote control device during a first time period prior to processing the current instruction is less than a first threshold value, the at least one processing unit determines to include the current acknowledgement request in the current instruction, if the number of past acknowledgements successfully received by the remote control device during the first time period is less than a second threshold value greater than the first threshold value, but at least equals the first threshold value, the at least one processing unit determines to include the acknowledgement request only if a second time period has elapsed since the remote control device has transmitted an instruction of a same type as the current instruction, with an acknowledgement request: and if the number of past acknowledgments successfully received by the remote control device during the first time period prior to the processing of the current instruction is greater or equal to the second threshold value, or if less than the second time period has elapsed since the remote control device has transmitted the instruction of the same type as the current instruction with an acknowledgment request, the at least one processing unit determines not to include the acknowledgment request in the current instruction;

if the at least one processing unit determines to include the current acknowledgement request in the current instruction, transmits the current instruction with the current acknowledgement request, via the at least one communication component, and if the at least one processing unit determines to not include the current acknowledgement request in the current instruction, transmits the current instruction without an acknowledgement request, via the at least one communication component.

10. The system of claim 9, wherein the at least one processing unit shortens the second time period when the number of past acknowledgements successfully received during the first time period is less than the second threshold value by at least a first amount and lengthens the second time period when the number of past acknowledgements successfully received during the first time period is less than the second threshold value by less than the first amount.

11. The system of claim 9, wherein the at least one processing unit measures the second time period according to at least one of a time elapsed since the instruction of the same type as the current instruction has been transmitted with an acknowledgement request or a number of instructions of the same type as the current instruction that have been transmitted since the instruction of the same type as the current instruction has been transmitted with an acknowledgement request.

12. The system of claim 9, wherein the at least one processing unit determines to include the current acknowledgement request if:

the current instruction is of a first classification of instruction, or the current instruction is of a second classification of instruction and a number of past acknowledgements successfully received during a time period is less than a threshold value.

13. The system of claim 9, wherein the current instruction transmitted by the at least one processing unit via the at least one communication component includes the current acknowledgement request and the at least one processing unit determines whether an acknowledgement is received within a timeout period in response to the current acknowledgement request.

14. The system of claim 13, wherein the at least one processing unit adds information regarding whether the acknowledgement is received within the timeout period in response to the current acknowledgement request to the statistics regarding receipt of acknowledgements transmitted in response to instructions previously transmitted by the remote control device.

15. The system of claim 13, wherein the at least one processing unit retransmits the current instruction via the communication component if the acknowledgement is not received within the timeout period in response to the current acknowledgement request.

16. The system of claim 13, wherein the current instruction transmitted by the at least one processing unit via the at least one communication component comprises at least one packet and the current acknowledgement request comprises at least one bit flag included in the at least one packet.

* * * * *